United States Patent
Ritter et al.

(10) Patent No.: US 11,578,763 B2
(45) Date of Patent: Feb. 14, 2023

(54) METHOD AND DEVICE FOR LUBRICATING A UNIVERSAL JOINT

(71) Applicant: VOITH PATENT GMBH, Heidenheim (DE)

(72) Inventors: Simon Ritter, Gundelfingen (DE); Dieter Maier, Giengen (DE)

(73) Assignee: Voith Patent GmbH, Heidenheim (DE)

( * ) Notice: Subject to any disclaimer, the term of this patent is extended or adjusted under 35 U.S.C. 154(b) by 317 days.

(21) Appl. No.: 16/650,442

(22) PCT Filed: Aug. 30, 2018

(86) PCT No.: PCT/EP2018/073324
§ 371 (c)(1),
(2) Date: Mar. 25, 2020

(87) PCT Pub. No.: WO2019/057462
PCT Pub. Date: Mar. 28, 2019

(65) Prior Publication Data
US 2020/0271169 A1    Aug. 27, 2020

(30) Foreign Application Priority Data
Sep. 25, 2017    (DE) .......................... 102017122107.7

(51) Int. Cl.
*F16D 3/41* (2006.01)
*F16D 3/38* (2006.01)
*F16C 33/66* (2006.01)

(52) U.S. Cl.
CPC .............. *F16D 3/41* (2013.01); *F16D 3/385* (2013.01); *F16C 33/6622* (2013.01); *F16D 2300/06* (2013.01)

(58) Field of Classification Search
CPC ........ F16D 3/41; F16D 3/385; F16D 2300/06; F16C 33/6622
USPC ...................................................... 464/12–14
See application file for complete search history.

(56) References Cited

U.S. PATENT DOCUMENTS

| | | | |
|---|---|---|---|
| 1,306,229 A * | 6/1919 | Myers ........................ | F16D 3/40 464/13 |
| 3,377,820 A | 4/1968 | Smith, Jr. | |
| 3,828,578 A | 8/1974 | Herscovici | |
| 5,263,552 A * | 11/1993 | Cline ......................... | F16D 3/41 464/13 |
| 5,342,240 A * | 8/1994 | Mazziotti ............. | F16C 33/7809 464/11 |
| 11,255,384 B2 * | 2/2022 | Kawarada .................. | F16D 3/38 |

FOREIGN PATENT DOCUMENTS

| | | |
|---|---|---|
| CN | 202660200 U | 1/2013 |
| CN | 103775519 A | 5/2014 |
| CN | 204458885 U | 7/2015 |

(Continued)

*Primary Examiner* — Greg Binda
(74) *Attorney, Agent, or Firm* — Laurence A. Greenberg; Werner H. Stemer; Ralph E. Locher

(57) ABSTRACT

A universal joint contains a first joint yoke and a second joint yoke. The first joint yoke and the second joint yoke are connected by a journal cross, ends of the journal cross being mounted in the joint yokes by bearings. In order to lubricate at least one of the bearings, at least one lubricant feed-through is provided, which is provided outside of a central bore of the journal cross.

13 Claims, 3 Drawing Sheets

(56) References Cited

FOREIGN PATENT DOCUMENTS

| | | | |
|---|---|---|---|
| DE | 102016210587 A1 | 12/2017 | |
| EP | 0878657 A2 | 11/1998 | |
| SU | 889936 A1 * | 12/1981 | .................. 464/14 |

* cited by examiner

METHOD AND DEVICE FOR LUBRICATING A UNIVERSAL JOINT

BACKGROUND OF THE INVENTION

Field of the Invention

The invention relates to a method and a device for lubricating a universal joint.

A lubricating device for a cardan shaft with a universal joint is known from EP 0 878 657 A2. The universal joint exhibits a joint yoke and a universal joint with bearings that are capable of being lubricated. A component that is fixed with respect to the housing is provided, through which the lubricant is guided to the cardan shaft and, through the latter by means of a transmission element, to the joint bearings. As a result, the lubrication takes place from a stationary component, that a lubrication can take place independently of the motion of the cardan shaft. The point of lubrication is easily accessible and suitable for connection to a centralized lubricating system.

A lubricating device for a universal joint is known from CN 202660200 U. By virtue of this lubricating device, an online lubrication is possible. On the cardan shaft a rotating ring with a nozzle is known for the provision of the lubricant. Two feed lines are shown on each side of the joint yoke.

From CN 20445885 U it is known to provide a separate lubricator for each bearing a cruciform shaft of a universal joint. For this purpose, the cruciform connection in the cruciform shaft of the universal joint is closed.

A universal-joint arrangement is known from DE 10 2016 210 587, in which the bearings of the universal joint can be lubricated with lubricant through an opening formed centrally in each of the bearing caps. However, for this purpose it is necessary that a lubrication takes place from each cap. In some installation situations, the universal joints cannot be accessed equally well from all sides. Consequently, it occurs rather frequently that the easily accessible lubricant accesses are operated preferentially and the lubricant accesses that are difficult to access are sometimes left out. As a result, cases of damage arise to an increased extent on the insufficiently lubricated mountings. A change of position from one of the sides of the cardan shaft to the opposite side of the cardan shaft may also be inconvenient for the lubricating, so that sometimes only the caps, with the lubricant openings, that are accessible from one of the sides of the cardan shaft have lubricant applied. Also as a result of this, defects at the insufficiently lubricated mountings may arise to an increased extent.

A disadvantageous aspect of the known lubricating devices is that they are cost-intensive solely by reason of the number of parts. A further factor is that the co-rotating parts of the lubricating device also have to be accelerated together and consequently also have to withstand the accelerations.

SUMMARY OF THE INVENTION

The object underlying the invention is to enable a lubrication of a universal joint in a more convenient manner.

In particular, it is the object of the invention to facilitate accessibility for the purpose of lubricating mountings of a universal joint in a discrete standstill position.

The object of the invention is achieved by at least one feedthrough for lubricant being formed in the journal cross. The feedthrough is provided for the supply of lubricant to one of the mountings. By virtue of the feedthrough, it is possible to lubricate a mounting of an end of a journal cross, in which connection the mounting may have been arranged at an angle of 90° or 180°. The feedthrough serves for the supply of lubricant. Consequently, it is possible to supply the mounting assigned to this journal end and a further mounting with lubricant by means of the feedthrough. In this connection, both mountings can have lubricant applied separately from one another. As a result, it is also possible to choose the pressure at which the lubricant is supplied for each lubrication event and in a manner depending on the type of the supply or on the position of the bearing to be lubricated.

As a rule, a mounting of a journal end of a journal cross comprises a thrust bearing and a radial bearing.

In a preferred embodiment of a journal cross, there is provision that the at least one feedthrough is formed in the journal cross, spaced from at least one of the center axes of the journal cross. Particularly preferably, the feedthrough is arranged at least on a partial region parallel to the center axis. Consequently, an arrangement of a feedthrough within a central recess which is present in the journal cross is possible. In order to be able to withstand the possible accelerations, a stable fastening is required.

In a preferred embodiment of a journal cross, the journal cross exhibits at least two separate feedthroughs for lubricant. These feedthroughs can be utilized for the application of lubricant. Hence it is possible to lubricate all four mountings from two ends of the universal joint, by two of the mountings being able to have lubricant applied by means of the first and the second feedthrough.

In a preferred embodiment of a journal cross, two of the lubricant feedthroughs are preferentially arranged at an angle of 90°. Each individual feedthrough may have been realized in rectilinear or angled manner.

In a preferred embodiment, there is provision that the feedthrough is arranged parallel to one of the center axes. As a result, the feedthroughs have been realized in rectilinear manner, this being easy to produce. In order to be able to reach all the bearings, the two feedthroughs are preferably arranged offset relative to one another at a 90° angle.

In a further embodiment, there is provision that at least one feedthrough is formed in one piece with the journal cross. It is meant by this that no components have been introduced in the journal cross in order to provide the feedthrough. A feedthrough of such a type can be formed by means of a bore.

In a preferred embodiment, there is provision that openings of feedthroughs for lubricant are arranged at two opposing journal ends, and all the thrust bearings are capable of being lubricated by means of these feedthroughs. The feedthroughs must have been realized in angular manner.

The journal cross described previously is suitable for use in a universal joint. The universal joint comprises a first joint yoke and a second joint yoke and a journal cross with journal-cross ends, ends of the journal cross being supported in the first and the second joint yoke. In this case, the universal joint includes a journal cross as claimed in one of the preceding claims. As a result, it is possible to lubricate the bearings of the universal joint with reduced effort. At least two bearings can be lubricated from one joint-yoke side. It is possible to provide a standstill position in which at least one bearing of the universal joint that is difficult to access can have lubricant applied from one joint-yoke side by means of a feedthrough.

In a preferred embodiment of a universal joint, there is provision that the universal joint exhibits, on two opposing sides, two lubricant feed lines in each instance, each lubricant feed line being assigned to precisely one bearing. As a result, it is possible to lubricate all the mountings of the universal joint from these two sides. In the case of a non-articulated installation it is, in particular, also possible to provide that the lubricant feed line is arranged on the only rotating joint yoke. Lubricant can then be supplied through feed pipes from a central lubricant feed line to the lubricant feed lines. By virtue of the central lubricant feed line, all the mountings can have lubricant applied separately. This central lubricant feed line may have been arranged on the joint yoke or on the cardan shaft. Hence a greasing can be carried out particularly conveniently, without a change of position being required.

In a preferred embodiment of a universal joint, there is provision that feed lines for lubricant which have been provided at two positions on the universal joint arranged at an angle of 90° are provided, said feed lines preferentially being formed in caps which have been provided. As a result, it is conveniently possible to lubricate all the mountings of the universal joint in a standstill position from one side of the universal joint.

In a further embodiment, there is provision that the universal joint includes four joint caps, and lubricant feed lines are formed in only one of the caps. The journal cross exhibits three feedthroughs, so that lubricant can be supplied through the feedthroughs to the other ends of the journal cross.

It has turned out to be advantageous to provide a cardan shaft with a universal joint according to the invention. In this case, has turned out to be particularly advantageous to provide the lubricant feed lines at opposing journal ends. In this connection, in the case of a non-articulated installation a central lubricant feed line may be arranged on the cardan shaft. The central lubricant feed line comprises individual lubricant feed lines assigned to the individual mountings.

A method according to the invention for greasing mountings of a cardan shaft, in particular radial bearings and thrust bearings of a universal joint, is distinguished in that a standstill position is assumed and subsequently the individual mountings have lubricant applied, separately from one another. As a result, the lubricant metering can be metered individually for each mounting. In the course of the metering of lubricant, the lubricant can be pressurized at varying pressures. In addition, the amount of lubricant introduced can be metered individually, and consequently it can be ensured that sufficient lubrication has been carried out.

The solution according to the invention will be described in more detail below with reference to a few exemplary embodiments. The exemplary embodiments shown may involve independent inventive aspects.

BRIEF DESCRIPTION OF THE SEVERAL VIEWS OF THE DRAWING

Shown are.

DETAILED DESCRIPTION OF THE INVENTION

Figure 1:
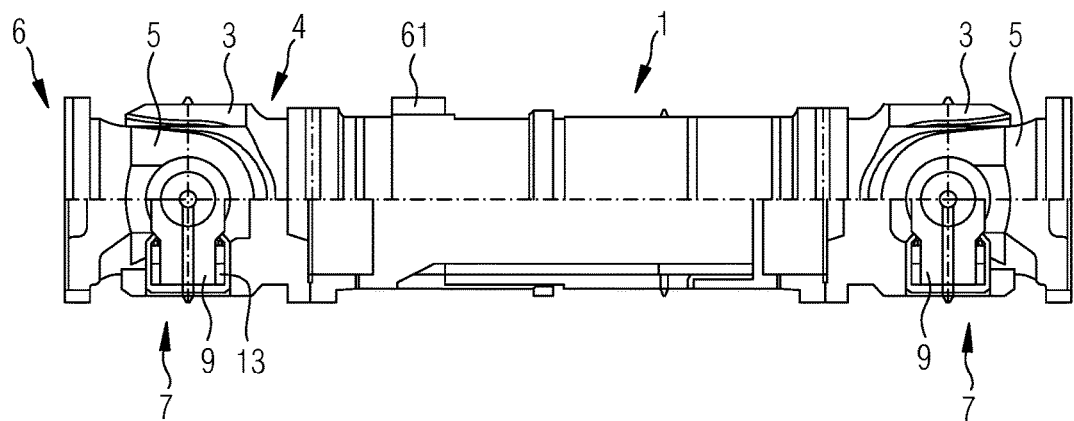
FIG. 1: cardan shaft

FIG. 1 shows a cardan shaft 1 having a body with a universal joint at both ends. Each of the universal joints exhibits a first joint yoke 3 and a second joint yoke 5. The first joint yoke 3 is actively connected to the second joint yoke 5 via a journal cross 9. When a rotational motion is introduced via the first joint yoke 3, a rotational motion is transmitted to the second joint yoke 5, and conversely. In this connection, the axial axis of the first joint yoke 3 may have been arranged in angular manner relative to the axial axis of the second joint yoke 5. This angle is designated as the articulation angle. When it is running at an articulation angle, the simple universal joint 7 generates a non-uniformity—that is to say, on the drive side it is driven at constant speed, rotating about the axial axis thereof, but on the output side it rotates sometimes a little faster and sometimes a little more slowly than the drive side. The non-uniformity increases with the articulation angle. The joint yoke, which in the installed state executes only a rotational motion about its axial axis, is designated as a non-articulated joint part 4 or joint yoke.

Figure 2:
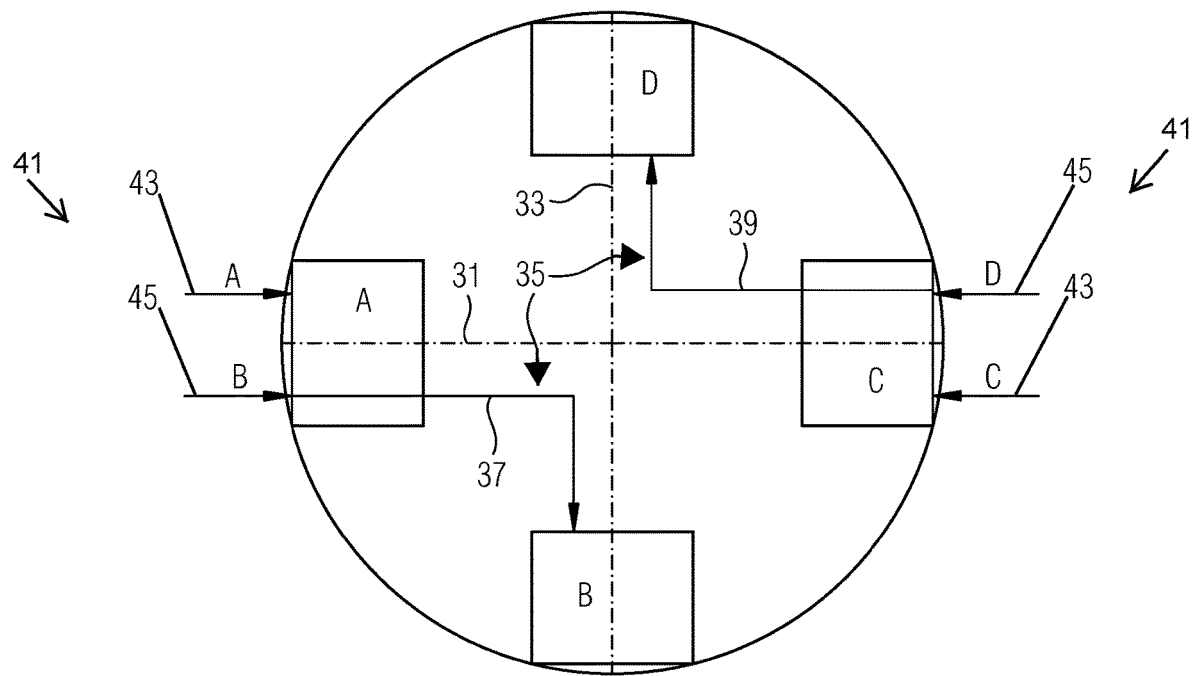
FIG. 2: sketch of lubricant feed lines, opposing

In FIG. 2, feedthroughs 35 for a lubrication of bearings 12 of the universal joint 7 are shown. The universal joint 7 exhibits radial bearings 15 and thrust bearings 13. By virtue of the radial bearings 15, the journal ends 11 are supported radially in relation to the center axis of the journal cross 9. By virtue of the thrust bearings 13, the journals of the journal cross 9 are supported axially. In the exemplary embodiment shown, this thrust bearing 13 is provided terminally at the journal end 11.

In the exemplary embodiment shown, the mountings of the ends of the journal cross 9 have been represented in very simplified manner and labeled by A, B, C and D. In this exemplary embodiment, a first lubricant feed line 43 and a second lubricant feed line 45 have been assigned to a journal-cross end A. By virtue of the first lubricant feed line 43, the bearings of this journal end have lubricant applied. As a result, on the one hand new lubricant can be introduced, and older lubricant can also be expressed from the bearing by the new lubricant. In this way, an exchange of lubricant is consequently also possible. The excess of lubricant emerges again at a lubricant outlet 51.

The second lubricant feed line 45 is connected to mounting B via a first feedthrough 37. Via this first feedthrough 37, lubricant can be supplied to mounting B. In this exemplary embodiment, the first feedthrough 37 has been realized in angled manner, and mounting B is arranged at a 90° angle relative to mounting A. A lubrication of mountings C and D is provided in the same way. In this connection, once again a first lubricant feed line 43 is provided for the lubrication for the bearings arranged there. Mounting D is supplied with lubricant via a second feedthrough 39. In this exemplary embodiment, the feed lines for lubricant are provided at two opposing ends of the journal cross. As a result, it is possible to provide a connection to a central lubricant feed line 61 in the case of a non-articulated arrangement of the joint yoke 3. Lubricant can be supplied to each mounting A, B, C, D from this central lubricant feed line 61. Each mounting A, B, C, D has been assigned its own lubricant feed line 41. As a result, it is possible to apply lubricant appropriately to each bearing. As a result, each mounting can be supplied with lubricant in a manner matched to the actual demand. But the advantage is that in the case of a standstill of the cardan shaft the cardan shaft can be positioned purposefully in a position in which the centralized lubricating system is easily accessible. A lubrication of the bearings is provided at a standstill. The lubrication can, however, also take place in operation via a rotary feedthrough.

Figure 3:
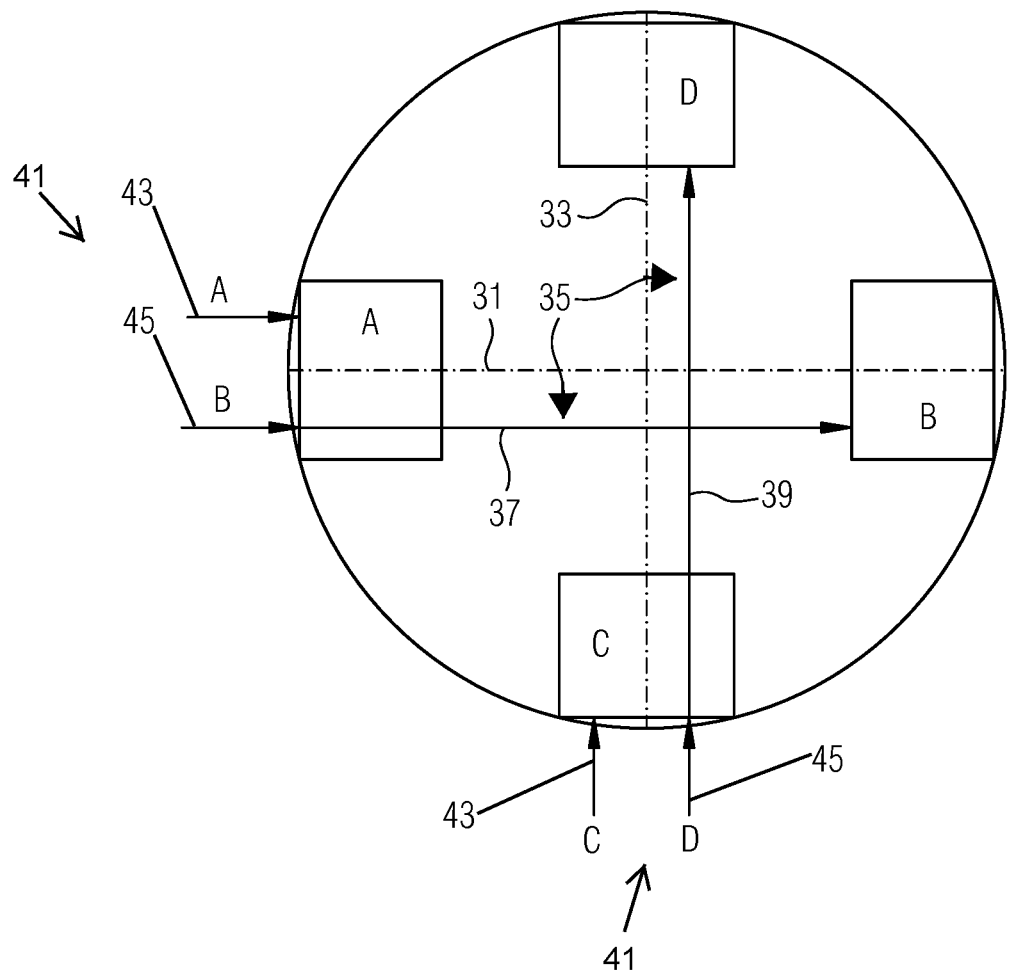
FIG. 3: sketch of lubricant feed lines at a 90° angle

An alternative version is shown in FIG. 3. In this version, two lubricant feed lines have been respectively assigned to two journal ends. The lubricant feed lines 41 are arranged at an angle of 90°. As a result, it is possible to lubricate all the bearings of this universal joint at a standstill of the universal joint 7, without a change-over to the other side of the universal joint and hence of the cardan shaft.

In this version, the first feedthrough 37 to mounting B has been formed in rectilinear manner in the journal cross. The second feedthrough 39 to mounting D has also been realized in rectilinear manner. The first center axis 31 and the second center axis 33 of the journal cross 9 have been represented by dashed lines. The feedthroughs 35 for the lubricant are spaced from at least one of the center axes 31, 33. The feedthroughs 35, are parallel to one of the center axes 31, 33. The feedthroughs 35 are formed in the journal cross 9. The feedthroughs 35 have openings for the lubricant, the openings are disposed at two opposing journal ends, and all of said mountings are capable of being lubricated the feedthroughs 35.

Figure 4:
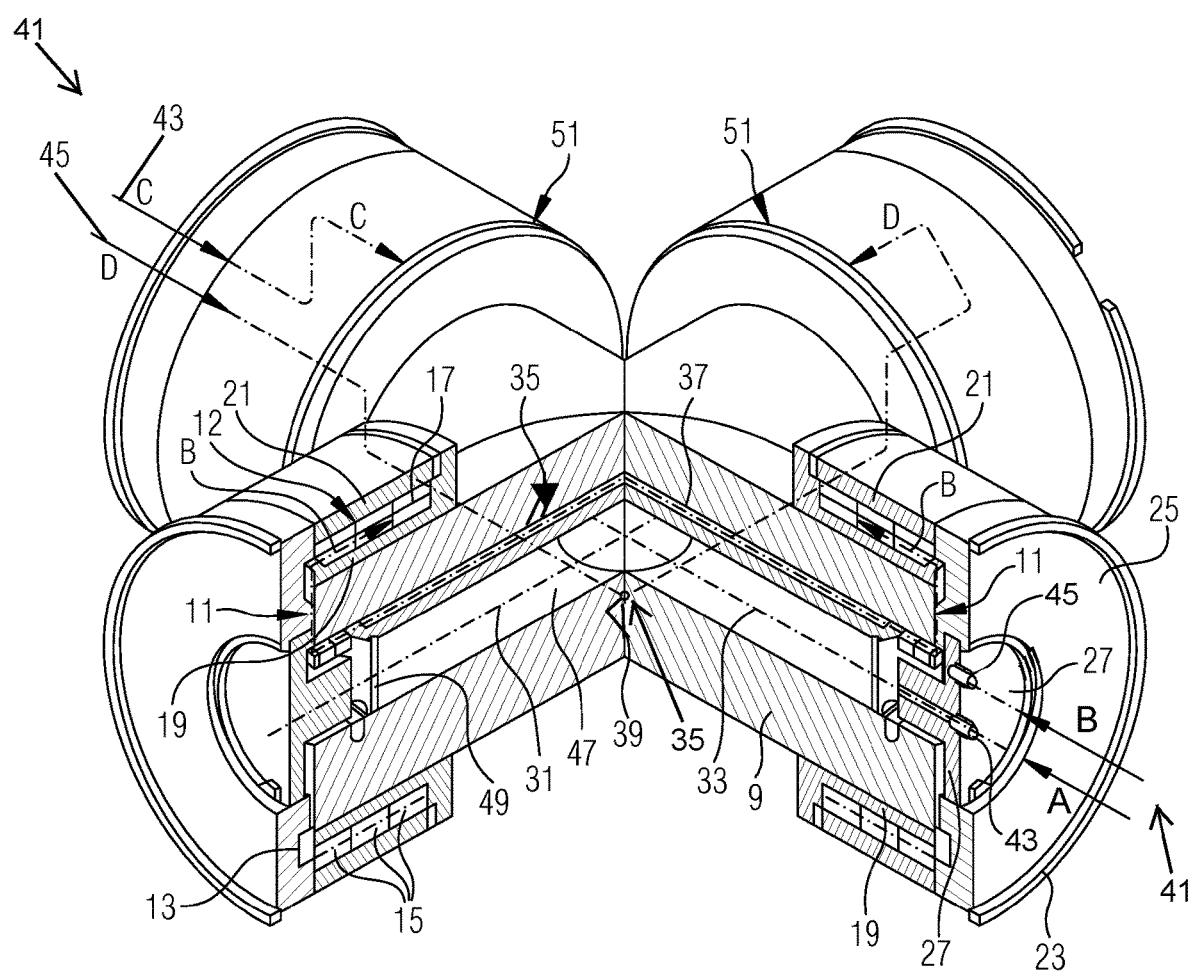
FIG. 4: journal cross

In FIG. 4, the structure of a journal cross with bearings is represented in detailed manner. The journal cross 9 has been realized in one piece. A central recess 47 is formed in the journal cross. The center axes 31 and 33 of the journal cross have been represented by dashed lines. This central recess 47 is sealed at the end by an inner cap 27. A closure plate 49 is arranged within the central recess in each journal ends, so that there is a gap between the inner cap 27 and the closure plate 49. A lubricant feed line 45 is formed in the inner cap 27. A lubricant feedline 43, 45 of the lubricant feedlines 41 is formed only in one of the inner caps 27 assigned to the journal of the journal cross 9. When lubricant is applied, the lubricant passes into the gap between the inner cap 27 and the closure plate 49. From there, the lubricant passes into the lubricant feedthrough 37 formed in the journal cross. In the concrete exemplary embodiment, the lubricant passes into the first feedthrough 37. The feedthrough has been realized in angled manner in accordance with FIG. 2. Via this feedthrough, the lubricant reaches the assigned mounting B. In mounting B, the lubricant is conveyed to the thrust bearing 13 via the radial bearing 15 of mounting B. By virtue of the thrust bearing, the lubricant can emerge again at the lubricant outlet 51. As a result, a partial exchange of the lubricant can also be carried out, by lubricant being introduced until such time as lubricant emerges again almost without contaminants at the lubricant outlet 51.

The radial bearing 15 has been realized as a roller bearing with rolling bodies 17. The rolling bodies 17 are arranged between an inner bearing element 19 and an outer bearing element 21. The inner bearing element 19 and the outer bearing element 21 are arranged coaxially in relation to the journal. An outer cap 25 is arranged axially at the end. This outer cap 25 is secured in the recess of the joint yoke by a circlip 23. As becomes evident from this representation in particular, only a few components are needed in order to be able to lubricate two mountings from one journal end.

LIST OF REFERENCE SYMBOLS

1 cardan shaft
3 first joint yoke
4 non-articulated joint part
5 second joint yoke
6 articulated joint part
7 universal joint
9 journal cross
11 ends, journal cross
12 mounting, bearings overall
13 thrust bearing
15 radial bearing
17 rolling body
19 inner bearing element
21 outer bearing element
23 circlip
25 outer cap
27 inner cap
31 first center axis
33 second center axis
35 feedthrough for lubricant
37 first feedthrough
39 second feedthrough
41 lubricant feed line
43 first lubricant feed line
45 second lubricant feed line
47 central recess, journal cross
49 closure plate
51 lubricant outlet
61 central lubricant feed line

The invention claimed is:

1. A journal cross for a universal joint, the journal cross comprising:
   journal-cross ends;
   mountings assigned to said journal-cross ends; and
   at least one feedthrough formed in said journal cross, said at least one feedthrough for a lubricant, said at least one feedthrough being provided for a supply of the lubricant from one of said journal cross ends to precisely one of said mountings assigned to a further one of said journal-cross ends.

2. The journal cross according to claim 1, wherein:
   the universal joint has two center axes; and
   said feedthrough for the lubricant is spaced from at least one of the center axes.

3. The journal cross according to claim 2, wherein said at least one feedthrough is disposed parallel to one of the center axes.

4. The journal cross according to claim 1, wherein said feedthrough is one of at least two separate feedthroughs for the lubricant.

5. The journal cross according to claim 1, wherein said at least one feedthrough has a 90° angle bend.

6. The journal cross as claimed in claim 1, wherein said at least one feedthrough is formed in the journal cross.

7. The journal cross according to claim 1, wherein said at least one feedthrough is one of a plurality of feedthroughs having openings for the lubricant, said openings are disposed at two opposing said journal ends, and all of said mountings are capable of being lubricated by means of said feedthroughs.

8. The journal cross according to claim 7, wherein said mountings include thrust bearings and radial bearings.

9. The journal cross according to claim 1, wherein said at least one feedthrough is one of two feedthroughs each having a 90° angle bend.

10. A universal joint, comprising:
    a first joint yoke;
    a second joint yoke; and
    a journal cross having ends supported in said first and second joint yokes, said journal cross further having mountings assigned to said ends and at least one feedthrough formed in said journal cross, said at least one feedthrough for a lubricant, said at least one feedthrough being provided for a supply of the lubricant from one of said ends to precisely one of said mountings assigned to a further one of said ends.

11. The universal joint according to claim 10, further comprising lubricant feed lines and that on two opposing sides of the universal joint, the universal joint has two said lubricant feed lines in each instance, each of said lubricant feed lines being assigned to precisely one of said mountings.

12. The universal joint as claimed in claim 10, further comprising:
    inner caps;
    outer caps; and
    lubricant feed lines for the lubricant are disposed at two positions on the universal joint and are disposed at an angle of 90° with regards to each other, said lubricant feed lines being formed in said inner caps.

13. The universal joint according to claim 12, wherein:
    said journal cross has a journal; and
    a lubricant feedline of said lubricant feedlines is formed only in one of said inner caps assigned to said journal of said journal cross.

* * * * *